Jan. 21, 1958    J. D. MITCHELL    2,820,302
MULTIPLE SPIRIT LEVEL
Filed June 21, 1956

JHON D. MITCHELL
*INVENTOR.*

United States Patent Office 2,820,302
Patented Jan. 21, 1958

2,820,302

MULTIPLE SPIRIT LEVEL

Jhon D. Mitchell, Portland, Oreg.

Application June 21, 1956, Serial No. 592,964

1 Claim. (Cl. 33—207)

This invention relates to improvements in a composite structure of a plurality of spirit levels combined for handling as a single unit and characterized from a standpoint of newness by a number of features especially adapted for use in connection with calibrated members such as carpenter's squares, and similar tools, the consolidated structure being considered aptly fitting for use by carpenters, stone and brick masons, and other mechanics requiring its four-fold function in planning various jobs and classes of work.

One of the principal objects of the invention is the provision of a spirit level unit of this character embodying magnetic means for removably attaching the unit to a metallic tool as aforesaid or to any other metallic member such as a structural element of a building and the like, which is to be positioned vertically or horizontally, whereby the operation of positioning or leveling a workpiece is facilitated as to labor and time and without the necessity of supporting such a level by hand.

The foregoing and other objects will appear as my invention is more fully hereinafter described in the following specification, illustrated in the accompanying drawing and finally pointed out in the appended claim.

Figure 1:
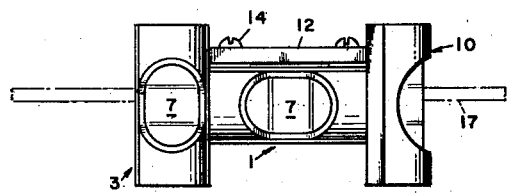
Figure 1 is a top plan view of a multiple spirit level made in accordance with my invention and shown attached to a metallic element indicated by broken lines.

Referring now more particularly to the drawing:

The invention comprises three identical spirit levels indicated generally by reference numerals 1, 2 and 3, each comprising a housing 4 sealed as at 5 at both of its ends and recessed as at 6 intermediate its ends to expose a spirit tube 7 contained within the housing. Each housing is mounted upon a longitudinally slotted base 8 having threaded openings 9 through one side thereof. The level 3 is secured in any approved manner to one end of the housing 4 of the level 1 at right angles thereto. To the opposite end of the level 1 is secured a level 10 also at right angles to the level 1.

Figure 3:
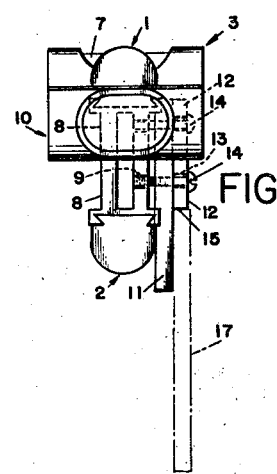
Figure 3 is a view of the right-hand end of Figure 2.

A permanent magnet 11 is secured to the base members 8 of the levels 1 and 2, by means of a plate 12 apertured as at 13 for the passage of fastening screws 14 therethrough, along both sides of the magnet 11 and into threaded engagement with threaded openings 9 in said base members 8. The clamping plate 12 is also a connection between levels 1 and 2, whose opposed bases 8 are in abutment as shown in Fig. 3.

It will be noted in Figures 2 and 3 that a shoulder 15 is provided by the extension of the magnet 11 below the bottom edge of the plate 12.

Figure 2:
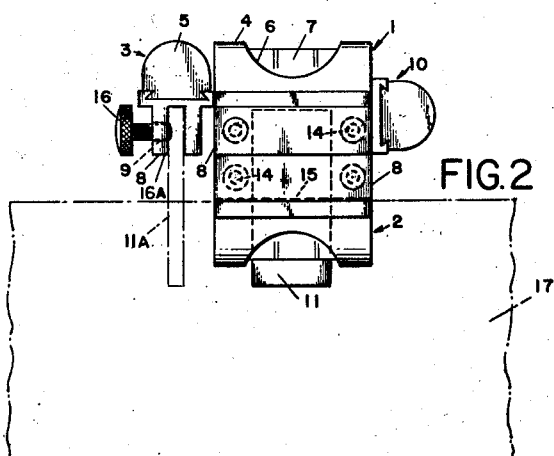
Figure 2 is a front view of Figure 1.

As shown in connection with the level 3 in Figure 2 an additional permanent magnet 11A can be secured at its top end within the slotted base 8 of the level 3 by substituting thumbscrews 16 for the screws 14.

When attaching the spirit level unit to a metallic carpenter's square, for example as indicated at 17, an operator can be sure that the levels 1, 2 and 3 will be parallel to the top edge of the article 17 when the shoulder 15, formed by the bottom edge of the plate 12, is pressed down firmly against the top edge thereof. Without this automatic positioning feature a user would be required to determine by guesswork the relationship of the levels to a straight edge of any metallic workpiece to which the unit is being applied. This same locating feature is provided in connection with the level 3 wherein shoulders 16A are provided by the bottom edges of its slotted base in relation to the magnet 11A clamped within the slot by the screws 16. Thus it will be seen that the invention can be quickly, conveniently and accurately attached to any straight edge of a tool or other metalic workpiece in parallel relation thereto by merely pressing the unit firmly into position as aforesaid.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A composite spirit level for handling as a unit comprising a horizontally disposed spirit level having a downwardly opening slotted base, a horizontally disposed spirit level secured to each end of the first mentioned spirit level and arranged at right angles thereto, another horizontally disposed spirit level having an upwardly opening slotted base identical with and abutting said slotted base of the first mentioned spirit level, a clamping plate having fastening elements extending therethrough near both of its ends and adapted for attachment to both of said bases, and a permanent magnet disposed between said fastening elements and clamped to both of said bases by the clamping plate, said magnet extending below said clamping plate whereby a shoulder is provided by the bottom edge of the clamping plate intermediate its ends for positioning all of said spirit levels parallel to a straight edge of a workpiece when applied and attached thereto by said magnet, and one of the spirit levels at one end of the first mentioned spirit level having a downwardly opening slotted base provided with fastening elements through one side thereof and thereby adapted for engagement with a permanent magnet independent of the first mentioned magnet, whereby the bottom of the last mentioned base on both sides of said slot provides a shoulder for positioning all of said spirit levels transversely of and parallel to a straight edge of a workpiece.

References Cited in the file of this patent

UNITED STATES PATENTS

| | | |
|---|---|---|
| 232,982 | Langdon | Oct. 5, 1880 |
| 565,098 | Traut | Aug. 4, 1896 |
| 834,132 | Hicks et al. | Oct. 23, 1906 |
| 2,535,791 | Fluke | Dec. 26, 1950 |
| 2,695,949 | Ashwill | Nov. 30, 1954 |